United States Patent
Sadiq et al.

(10) Patent No.: US 9,900,931 B2
(45) Date of Patent: Feb. 20, 2018

(54) METHOD AND APPARATUS FOR DEVICE TO DEVICE RELAY SELECTION

(71) Applicant: QUALCOMM Incorporated, San Diego, CA (US)

(72) Inventors: Bilal Sadiq, Somerville, NJ (US); Qing He, Cambridge, MA (US); Saurabha R. Tavildar, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 701 days.

(21) Appl. No.: 13/875,677

(22) Filed: May 2, 2013

(65) Prior Publication Data
US 2014/0329535 A1 Nov. 6, 2014

(51) Int. Cl.
*H04W 88/04* (2009.01)
*H04W 76/02* (2009.01)

(52) U.S. Cl.
CPC ......... *H04W 88/04* (2013.01); *H04W 76/023* (2013.01)

(58) Field of Classification Search
CPC ....... H04W 88/04; H04W 36/30; H04W 4/02; H04W 8/005; H04W 4/023; H04W 84/047; H04W 24/02; H04W 24/10; H04W 36/0094; H04W 36/04; H04W 40/00; H04W 40/22; H04W 40/246; H04W 4/025; H04W 64/00; H04W 72/048; H04W 4/021; H04W 52/245; H04W 76/023;
(Continued)

(56) References Cited

U.S. PATENT DOCUMENTS 5,903,618 A 5/1999 Miyake et al.
7,269,388 B2 * 9/2007 Poursabahian ......... H04L 29/06 370/252

(Continued)

FOREIGN PATENT DOCUMENTS

EP 1890440 A2 2/2008
WO 2010078210 7/2010
WO 2011129654 A2 10/2011

OTHER PUBLICATIONS

Calcev, et al., "Opportunistic two-hop relays for OFDMA cellular networks," 2008 IEEE Globecom Workshops, Nov. 2008, pp. 1-6.
Karaer et al., "Uplink performance optimization in relay enhanced LTE-Advanced networks," IEEE 20th International Symposium Personal, Indoor and Mobile Radio Communications, Sep. 2009, pp. 360-364.

(Continued)

*Primary Examiner* — George Eng
*Assistant Examiner* — Jing Gao
(74) *Attorney, Agent, or Firm* — Arent Fox LLP

(57) ABSTRACT

A method, an apparatus, and a computer program product for wireless communication are provided in connection with D2D relay link selection in a LTE based access network. In one example, a communications device is equipped to determine that the communications device (e.g., a UE) is able to establish a relay link with a candidate UE based on at least one of information associated with any preexisting access links with the candidate UE, information associated with any preexisting accessing links within a threshold vicinity of the UE or the candidate UE, or any other UE UL interference, determine that the candidate UE is able to support the relay link based on information associated with preexisting access links for the candidate UE, and perform a link establishment process for the relay link with the candidate UE based on the determinations.

60 Claims, 10 Drawing Sheets

(58) Field of Classification Search
CPC ..... H04W 84/10; H04W 84/18; H04W 16/14; H04W 36/0016; H04L 2001/0097
USPC ............. 455/452.1, 452.2, 453, 7, 13.1
See application file for complete search history.

(56) References Cited

U.S. PATENT DOCUMENTS

| | | | |
|---|---|---|---|
| 7,961,670 | B2 | 6/2011 | Park et al. |
| 8,169,919 | B2 | 5/2012 | Suh et al. |
| 8,199,721 | B2 | 6/2012 | Jung et al. |
| 8,817,702 | B2 | 8/2014 | Palanki et al. |
| 2007/0076684 | A1 | 4/2007 | Lee et al. |
| 2007/0214286 | A1 | 9/2007 | Muqattash et al. |
| 2008/0057973 | A1 | 3/2008 | Park |
| 2008/0227461 | A1 | 9/2008 | Dayal et al. |
| 2009/0270109 | A1 | 10/2009 | Wang et al. |
| 2009/0325625 | A1 | 12/2009 | Hugl et al. |
| 2010/0009675 | A1* | 1/2010 | Wijting ............... H04W 72/02 455/426.1 |
| 2010/0039947 | A1 | 2/2010 | Li et al. |
| 2010/0067427 | A1 | 3/2010 | Choudhury |
| 2010/0142433 | A1 | 6/2010 | Womack et al. |
| 2010/0157845 | A1 | 6/2010 | Womack et al. |
| 2010/0167743 | A1 | 7/2010 | Palanki et al. |
| 2010/0261426 | A1 | 10/2010 | Shin et al. |
| 2010/0261480 | A1 | 10/2010 | Cho et al. |
| 2011/0117907 | A1 | 5/2011 | Hooli et al. |
| 2011/0149769 | A1 | 6/2011 | Nagaraja |
| 2011/0228680 | A1 | 9/2011 | Ball et al. |
| 2011/0256827 | A1 | 10/2011 | Hart |
| 2011/0310747 | A1 | 12/2011 | Seo et al. |
| 2012/0236783 | A1 | 9/2012 | Park et al. |
| 2012/0265818 | A1 | 10/2012 | Van Phan et al. |
| 2013/0016630 | A1 | 1/2013 | Bhushan et al. |
| 2013/0021932 | A1 | 1/2013 | Damnjanovic et al. |
| 2013/0083722 | A1* | 4/2013 | Bhargava ............ H04W 72/085 370/315 |
| 2013/0165127 | A1 | 6/2013 | Ikegami |
| 2013/0244715 | A1 | 9/2013 | Kwon et al. |
| 2014/0066119 | A1 | 3/2014 | Tavildar et al. |
| 2014/0112162 | A1 | 4/2014 | Tavildar |
| 2014/0169261 | A1* | 6/2014 | Ming ................... H04W 88/04 370/315 |

OTHER PUBLICATIONS

Raghothaman, et al. "System Architecture for a Cellular Network with Cooperative Mobile Relay," Vehicular Technology Conference (VTC Fall), 2011 IEEE, pp. 1-5.

Vanganuru, et al., "Uplink system capacity of a cellular network with cooperative mobile relay," Wireless Telecommunications Symposium (WTS), Apr. 2011, pp. 1-7.

Fodor, et al., "Design aspects of network assisted device-to-device communications," IEEE Communications Magazine, Mar. 2012, vol. 50; Issue. 3, pp. 170-177.

Gkatzikis L., et al., "Low complexity algorithms for relay selection and power control in interference-limited environments," Modeling and Optimization in Mobile, Ad Hoc and Wireless Networks (WIOPT), 2010 Proceedings of the 8th International Symposium on, IEEE, Piscataway, NJ, USA, May 31, 2010 (May 31, 2010), pp. 278-287, XP031714617, ISBN: 978-1-4244-7523-0.

Lei L., et al., "Operator controlled device-to-device communications in LTE-advanced networks", IEEE Wireless Communications, IEEE Service Center, Piscataway, NJ, US, vol. 19, No. 3, Jun. 1, 2012 (Jun. 1, 2012), pp. 96-104, XP011480414, ISSN: 1536-1284, DOI: 10.1109/MWC.2012.6231164 p. 3-p. 7.

"3rd Generation Partnership Project; Technical Specification Group Services and System Aspects; Service requirements for the Evolved Packet System (EPS)", Release 12, 3GPP Standard; 3GPP TS 22.278, 3rd Generation Partnership Project (3GPP), Mobile Competence Centre; 650, Route Des Lucioles; F-06921 Sophia-Antipolis Cedex: France, vol. SA WG1, No. V12.2.0, Mar. 15, 2013 (Mar. 15, 2013), pp. 1-42, XP050692129, [retrieved on Mar. 15, 2013] p. 25, line 17—line 41.

International Search Report and Written Opinion—PCT/US2014/035848—ISA/EPO—Dec. 5, 2014.

LG Electronics et al., "Some Issues to consider for ProSe UE-to-UE Relay", 3GPP Draft: Draft S1-133101 LGE-Disc Some Issues to Consider for Prose UE-To-UE Relay V02, 3rd Generation Partnership Project (3GPP), Mobile Competence Centre; 650, Route Des Lucioles; F-06921 Sophi vol. SA WG1, no. New Delhi, India: May 6, 2013-May 10, 2013 Apr. 26, 2013 (Apr. 26, 2013), pp. 1-3, XP050707548, Retrieved from the Internet: URL: http://www.3gpp.org/ftp/tsg_sa/WG1_Serv/TSGS1_62_New_Delhi/docs/ [retrieved-on Apr. 26, 2013] section 2—section 3.

* cited by examiner

METHOD AND APPARATUS FOR DEVICE TO DEVICE RELAY SELECTION

BACKGROUND

Field

The present disclosure relates generally to communication systems, and more particularly, to device-to device (D2D) relay link selection and establishment in a long term evolution (LTE) based access network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication.

As the demand for D2D communication increases, there exists a need for methods/apparatuses for supporting various D2D communication configurations within LTE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with D2D relay link selection in a LTE based access network. In one example, a communications device is equipped to determine that the communications device (e.g., a user equipment (UE)) is able to establish a relay link with a candidate UE based on at least one of information associated with any preexisting access links with the candidate UE, information associated with any preexisting accessing links within a threshold vicinity of the UE or the candidate UE, or any other UE UL interference, determine that the candidate UE is able to support the relay link based on information associated with preexisting access links for the candidate UE, and perform a link establishment process for the relay link with the candidate UE based on the determinations.

According to related aspects, a method for D2D relay link selection in a LTE based access network is provided. The method can include determining that a UE is able to establish a relay link with a candidate UE based on at least one of information associated with any preexisting access links with the candidate UE, information associated with any preexisting access links within a threshold vicinity of the UE or the candidate UE, or any other UE UL interference. Further, the method can include determining that the candidate UE is able to support the relay link based on information associated with preexisting access links for the candidate UE. Moreover, the method may include performing a link establishment process for the relay link with the candidate UE based on the determinations.

Another aspect relates to a communications apparatus enabled to perform D2D relay link selection in a LTE based access network. The communications apparatus can include means for determining that a UE is able to establish a relay link with a candidate UE based on at least one of information associated with any preexisting access links with the candidate UE, information associated with any preexisting access links within a threshold vicinity of the UE or the candidate UE, or any other UE UL interference. Further, the communications apparatus can include means for determining that the candidate UE is able to support the relay link based on information associated with preexisting access links for the candidate UE. Moreover, the communications apparatus can include means for performing a link establishment process for the relay link with the candidate UE based on the determinations.

Another aspect relates to a communications apparatus. The apparatus can include a processing system configured to determine that a UE is able to establish a relay link with a candidate UE based on at least one of information associated with any preexisting access links with the candidate UE, information associated with any preexisting access links within a threshold vicinity of the UE or the candidate UE, or any other UE UL interference. Further, the processing system may be configured to determine that the candidate UE is able to support the relay link based on information associated with preexisting access links for the candidate UE. Moreover, the processing system may further be configured to perform a link establishment process for the relay link with the candidate UE based on the determinations.

Still another aspect relates to a computer program product, which can have a computer-readable medium including code for determining that a UE is able to establish a relay link with a candidate UE based on at least one of information associated with any preexisting access links with the candidate UE, information associated with any preexisting access links within a threshold vicinity of the UE or the candidate UE, or any other UE UL interference. Further, the computer-readable medium may include code for determining that the candidate UE is able to support the relay link based on information associated with preexisting access links for the candidate UE. Moreover, the computer-readable medium can include code for performing a link establishment process for the relay link with the candidate UE based on the determinations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
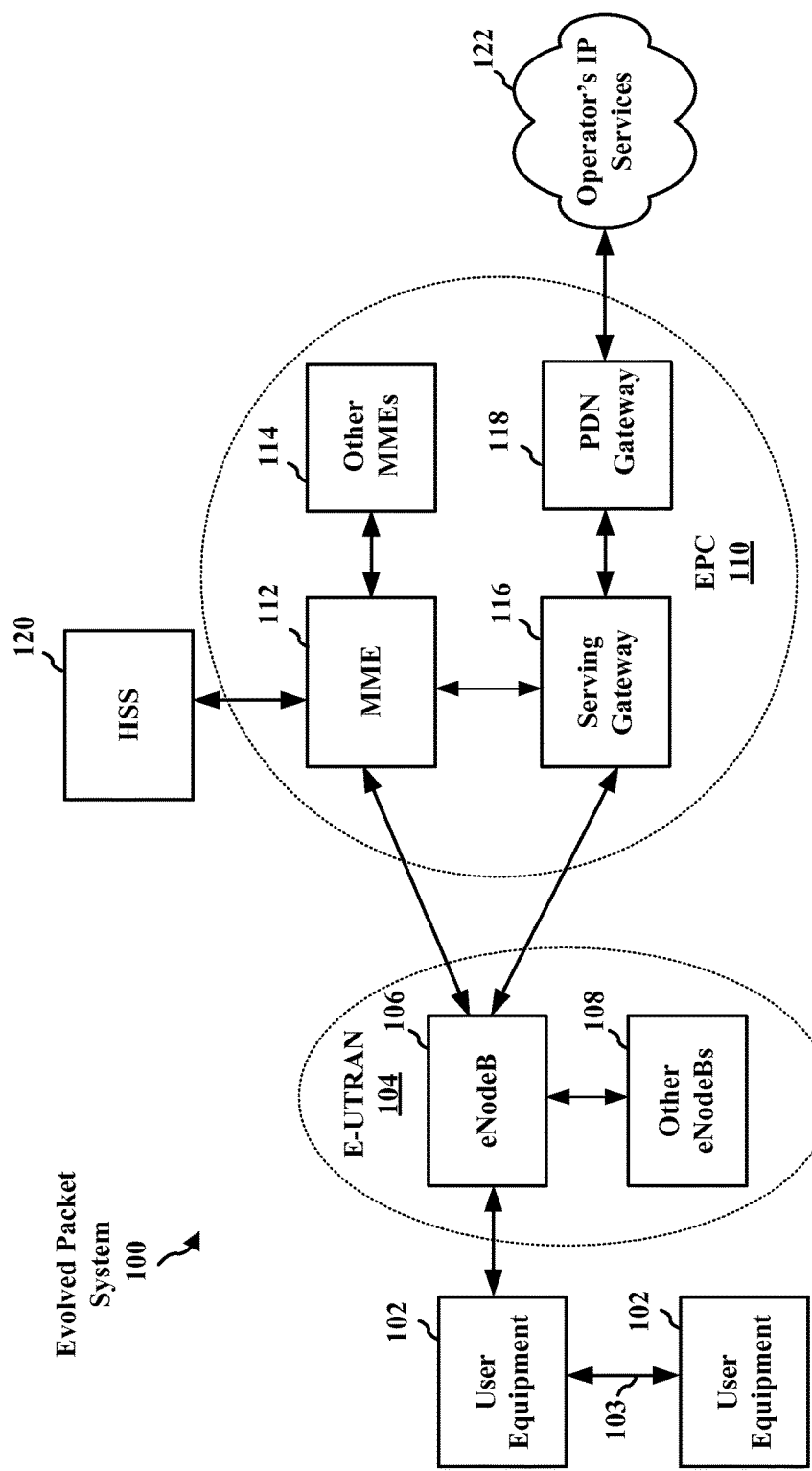
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UEs 102 may form D2D connections 103. In an aspect, the D2D connection 103 may be configured to allow the UEs 102 to communicate with each other. In another aspect, a UE 102 may act as a relay for another UE 102 using the D2D connection 103. The D2D connection 103 may provide a DL relay connection, an UL relay connection, and/or both DL and UL relay connections. In an operational aspect, the LTE network architecture 100 may allow for use of idle UEs 102 to act as relays for nearby active UEs 102. In an aspect, the idle UE (e.g., relay UE) may act as a relay for another UE (e.g., edge UE) through a D2D connection 103. For each relay candidate the impact of preexisting access links and UL links on this relay candidate may be determined, and the impact of choosing this candidate on preexisting access links may be determined Based on these determinations, a relay that improves end-to-end rate without impacting any existing access links may be selected.

The eNB 106 is connected by an Si interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
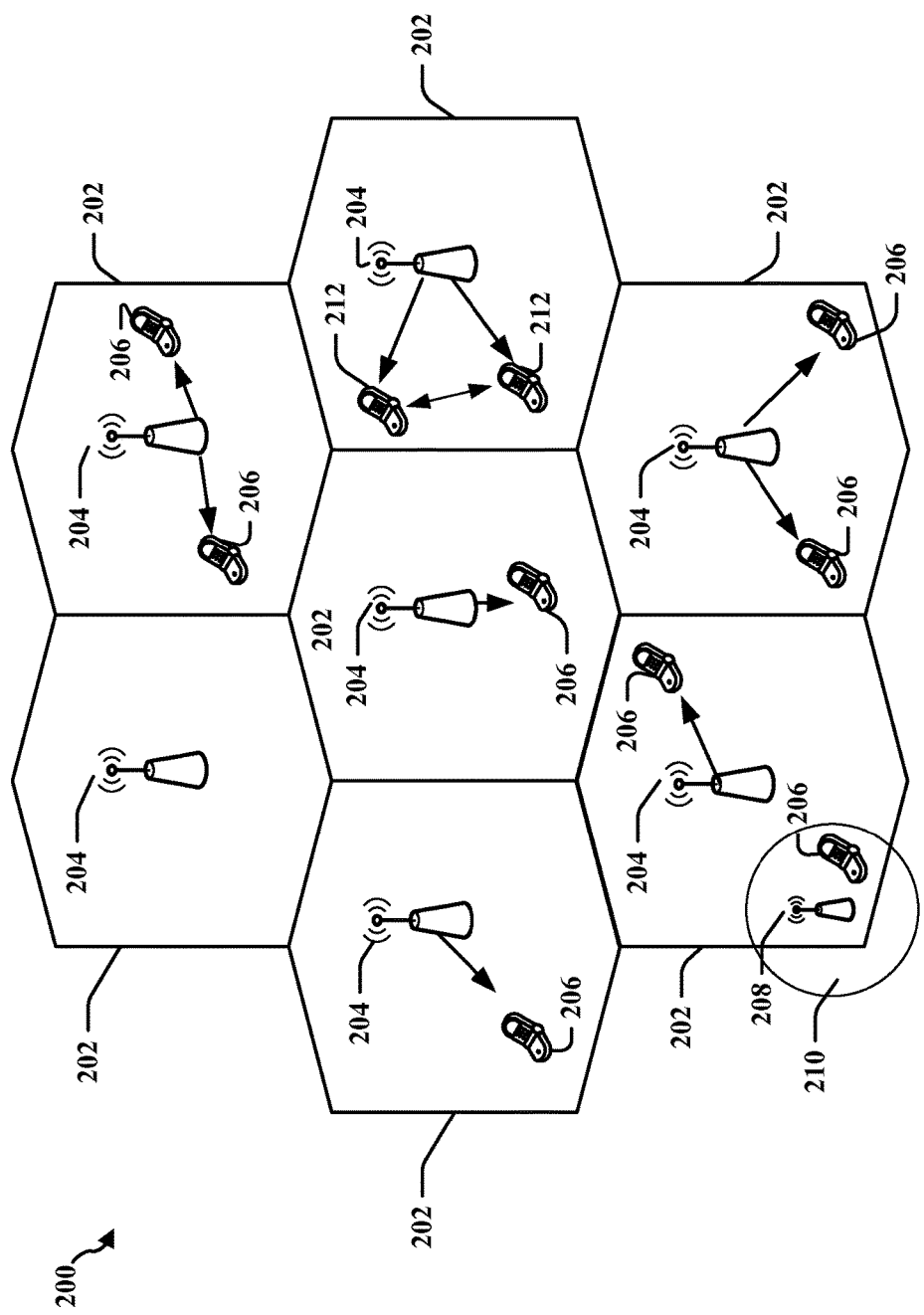
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
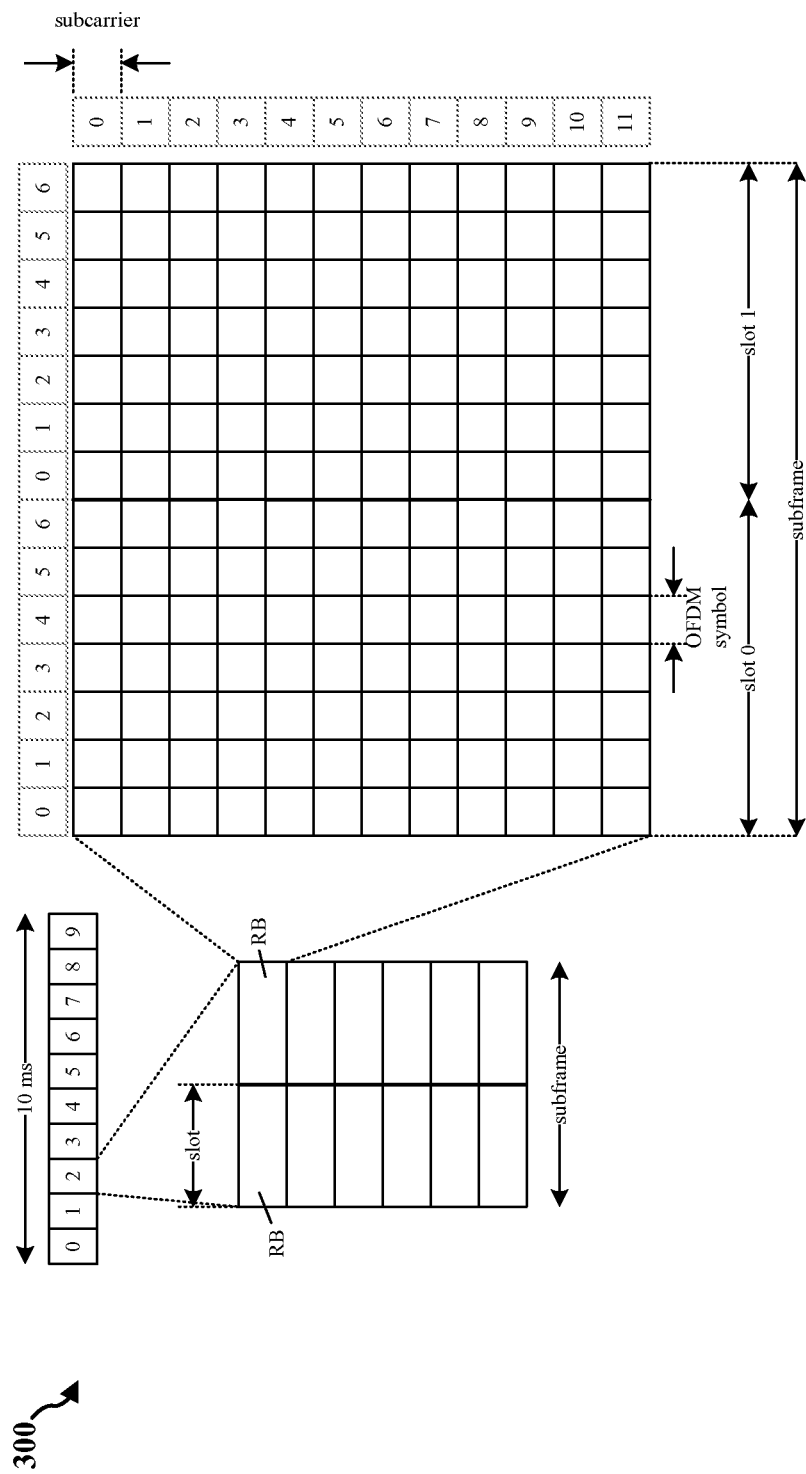
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
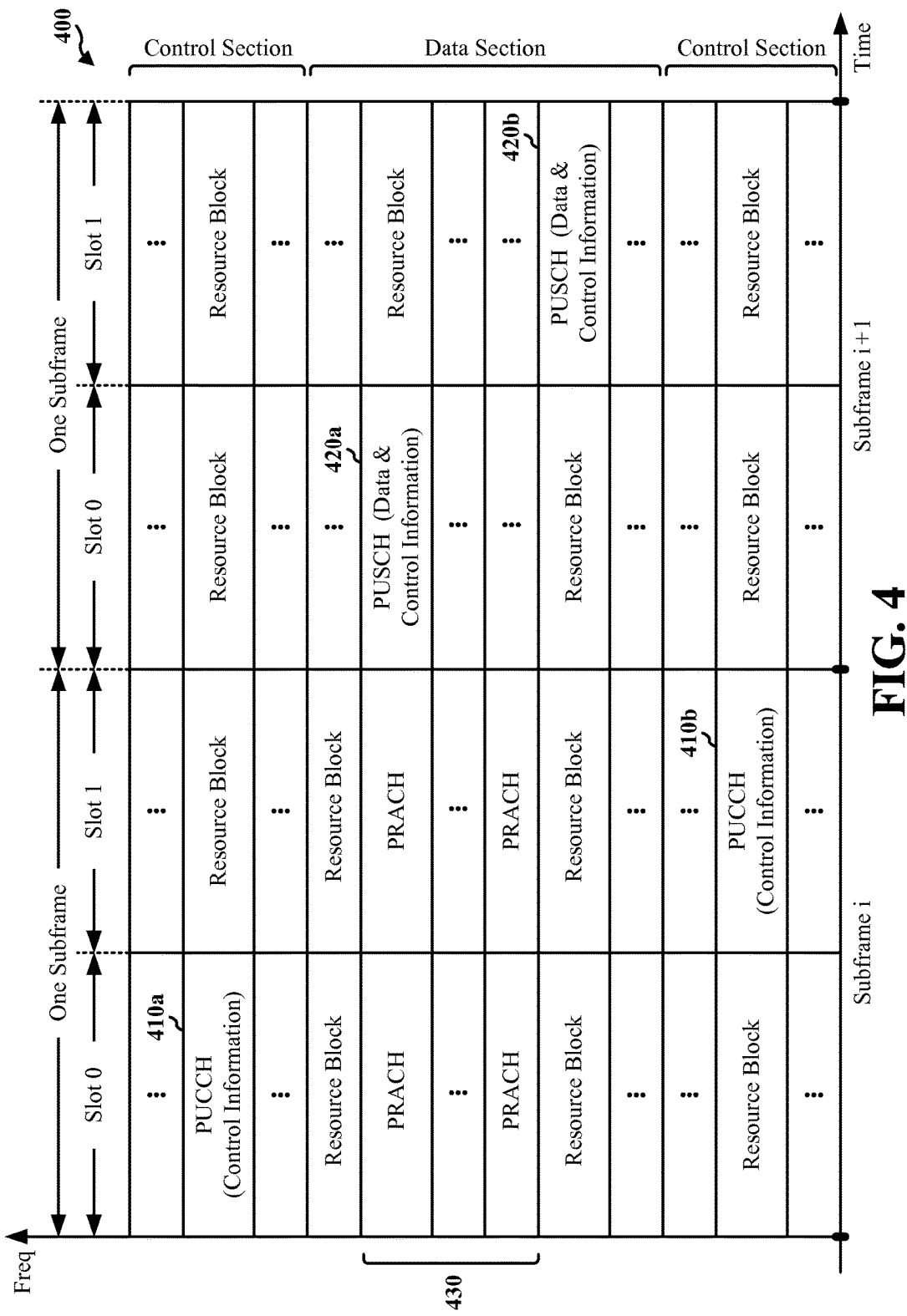
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
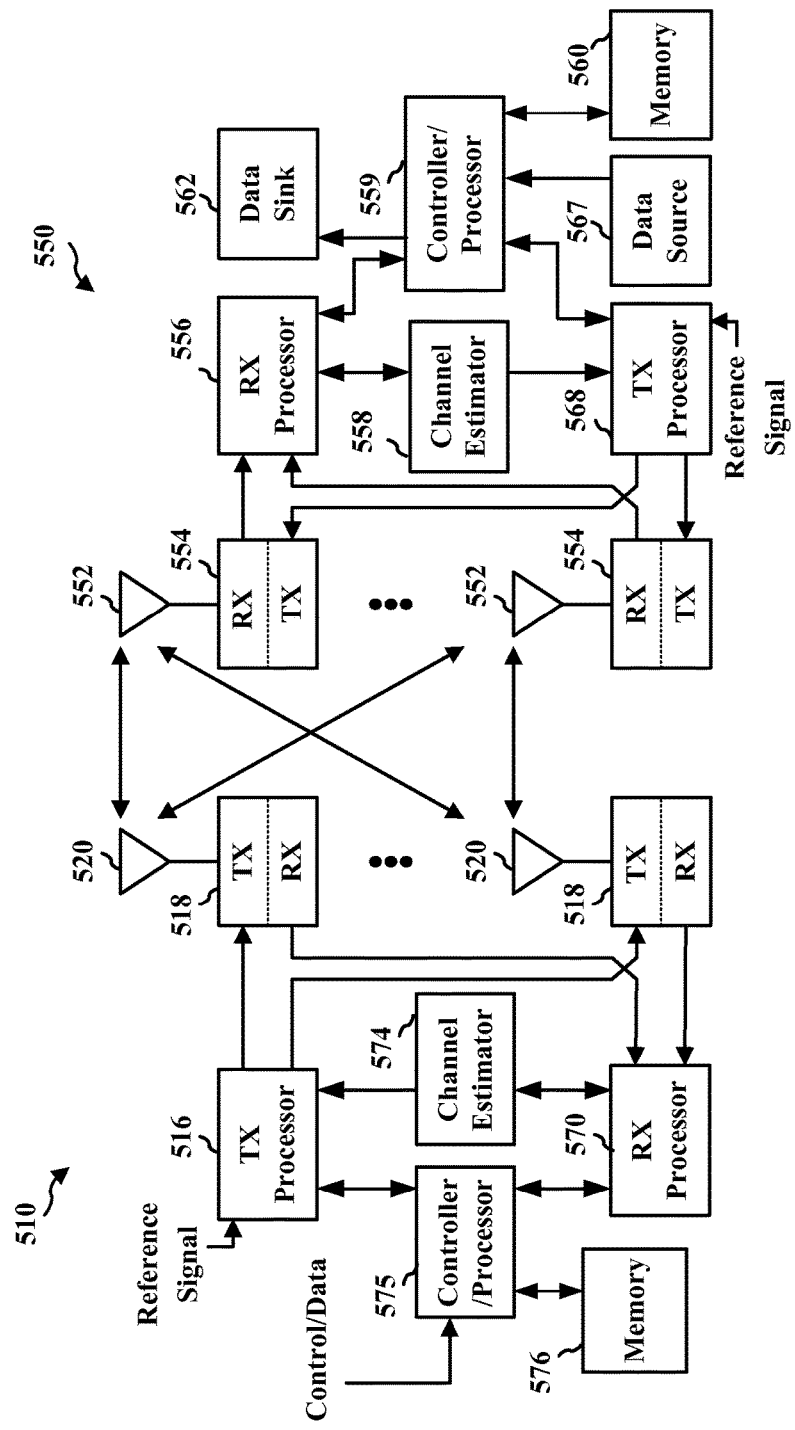
FIG. 5 is a diagram illustrating an example of an evolved Node B and user equipment in an access network.

FIG. 5 is a block diagram of an eNB 510 in communication with a UE 550 in an access network. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. In another aspect, UE 550 may communicate with other UEs similarly to how UE 550 communicates with eNB 510. Each receiver 554RX recovers information modulated onto an RF carrier and provides the information to the receive (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer. Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

Figure 6:
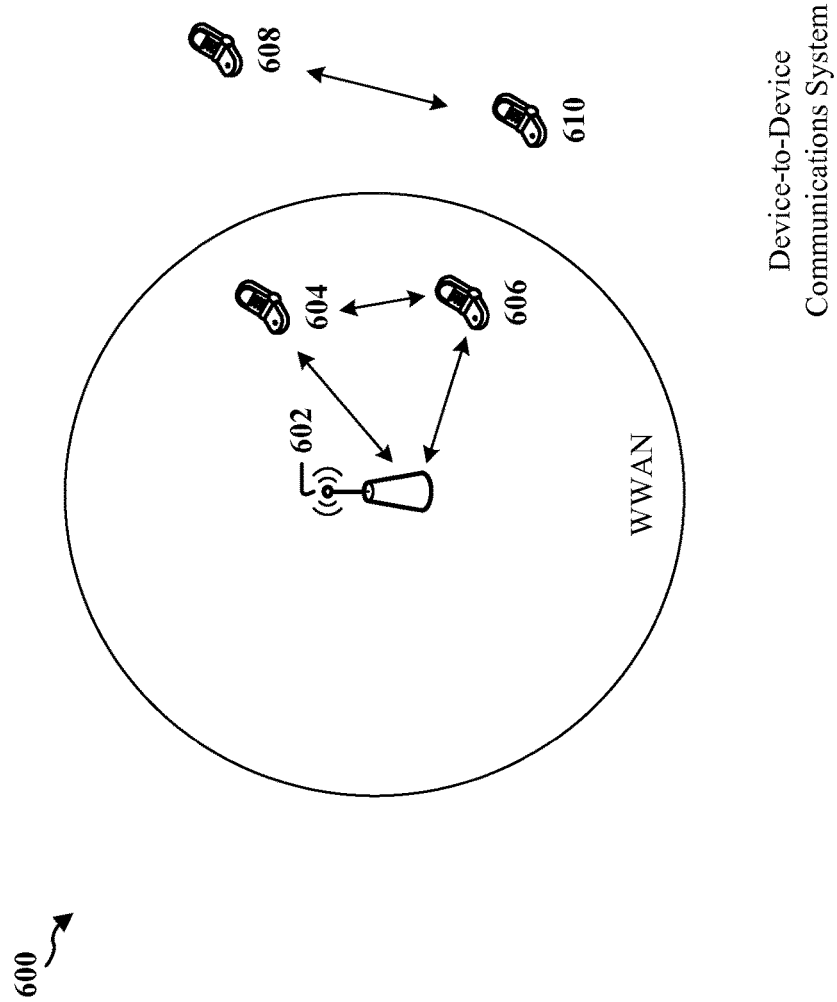
FIG. 6 is a diagram illustrating a device-to-device communications network.

FIG. 6 is a diagram of a device-to-device communications system 600. The device-to-device communications system 600 includes a plurality of wireless devices 604, 606, 608, 610. The device-to-device communications system 600 may overlap with a cellular communications system, such as for example, a wireless wide area network (WWAN). Some of the wireless devices 604, 606, 608, 610 may communicate together in device-to-device communication using the DL/UL WWAN spectrum, some may communicate with the base station 602, and some may do both. For example, as shown in FIG. 6, the wireless devices 608, 610 are in device-to-device communication and the wireless devices 604, 606 are in device-to-device communication. The wireless devices 604, 606 are also communicating with the base station 602.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 7:
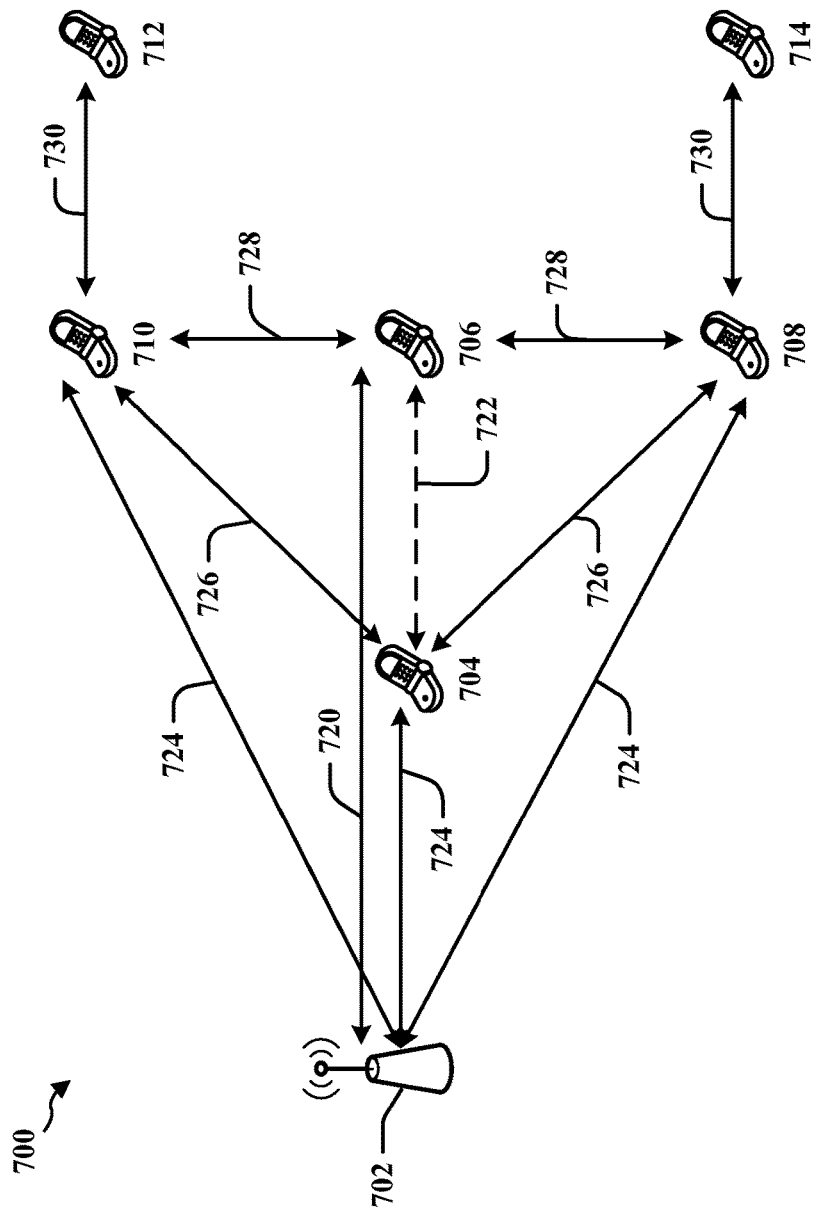
FIG. 7 is a diagram illustrating a device-to-device communications network that is configured to support D2D relay links, according to an aspect.

FIG. 7 is a diagram of a device-to-device communications system 700 configured to support use of idle UEs (e.g., UE 704) as relays, for the nearby active UEs (e.g., UE 706), for communication with a eNB 702. Device-to-device communications system 700 may include one or more eNBs 702 and one or more UEs (704, 706, 708, 710, 712, 714). Although any UE may act as a relay UE, for the sake of clarity, FIG. 7 depicts an aspect in which an edge UE 706 determines whether a candidate UE 704 may be selected as a relay UE for a D2D relay connection 722. Further, in another aspect, the process of selecting and establishing the D2D relay connection 722, described herein, may be performed by an idle relay candidate UE (e.g., UE 704), an edge UE (e.g., UE 706), and/or both UEs (704, 706). The D2D relay connection 722 may be established where an improved end-to-end rate is expected without impacting existing access links. In an aspect, the D2D relay connection 722 may provide UL relaying, DL relaying, and/or both UL and DL relaying.

In an operational aspect, UE 706 may determine whether any relay candidate UEs (e.g., 704, 708, 710) are present in system 700. In an aspect, the UE 706 may receive a message 720 from an eNB 702 including a list/array/matrix, etc. indicating the presence of the candidate UEs (e.g., 704, 708, 710). In another aspect, the UE 706 may listen for broadcasts 728 from other UEs. In such an aspect, the broadcast 728 may include information about any preexisting access links 726 and how many links the UE may support in total. In another aspect, the UE 706 may provide similar broadcast information 728 to other UEs (e.g., 704, 708, 710). Further, the UE 706 may determine and/or be provided with information associated with UL interference 724 from connections between UEs (e.g., 704, 708, 710) and eNB 702. Still further, the UE 706 may determine whether there are any pre-existing links 730 within the vicinity of the UE 706. Such pre-existing links 730 may be between UEs (710 and 712, 708 and 714) that are not being considered as a relay candidate UE 704.

Initially, UE 706 may determine whether it can support the D2D relay connection 722 if it were to be established. This determination may be based on information associated with any preexisting access links with the UE, any pre-existing links 730 within the vicinity (e.g., within a threshold range) of the UE, any other UE UL interference 724, etc. When the UE 706 determines it can handle the creation of the D2D relay connection 722, the UE 706 may determine whether the relay candidate UE 704 can support the D2D relay connection 722 if it were to be established. This determination may be based on information associated with preexisting access links 726 supported by the relay candidate UE 704 and a total number of access links that the relay candidate UE 704 may support. as noted above, the UE 706 may be aware of the number of preexisting access links 726 supported by the relay candidate UE 704 and a total number of access links that the relay candidate UE 704 may support from broadcast information 728 provided by the relay candidate UE 704. In an aspect, the broadcast information 728 may further indicate whether pre-existing links 730 may tolerate another interfering access link in the vicinity. In such an aspect, the indication may be provided as a value indicating a number of additional access links that may be tolerated within the vicinity of the link 730, a value indicating whether any more access links may be tolerated within the vicinity of the link 730, etc. Where the UE 706 can support the D2D relay connection 722 and the relay candidate UE 704 can support the D2D relay connection 722, the UEs 704, 706 may establish the D2D relay connection 722.

Figure 8:
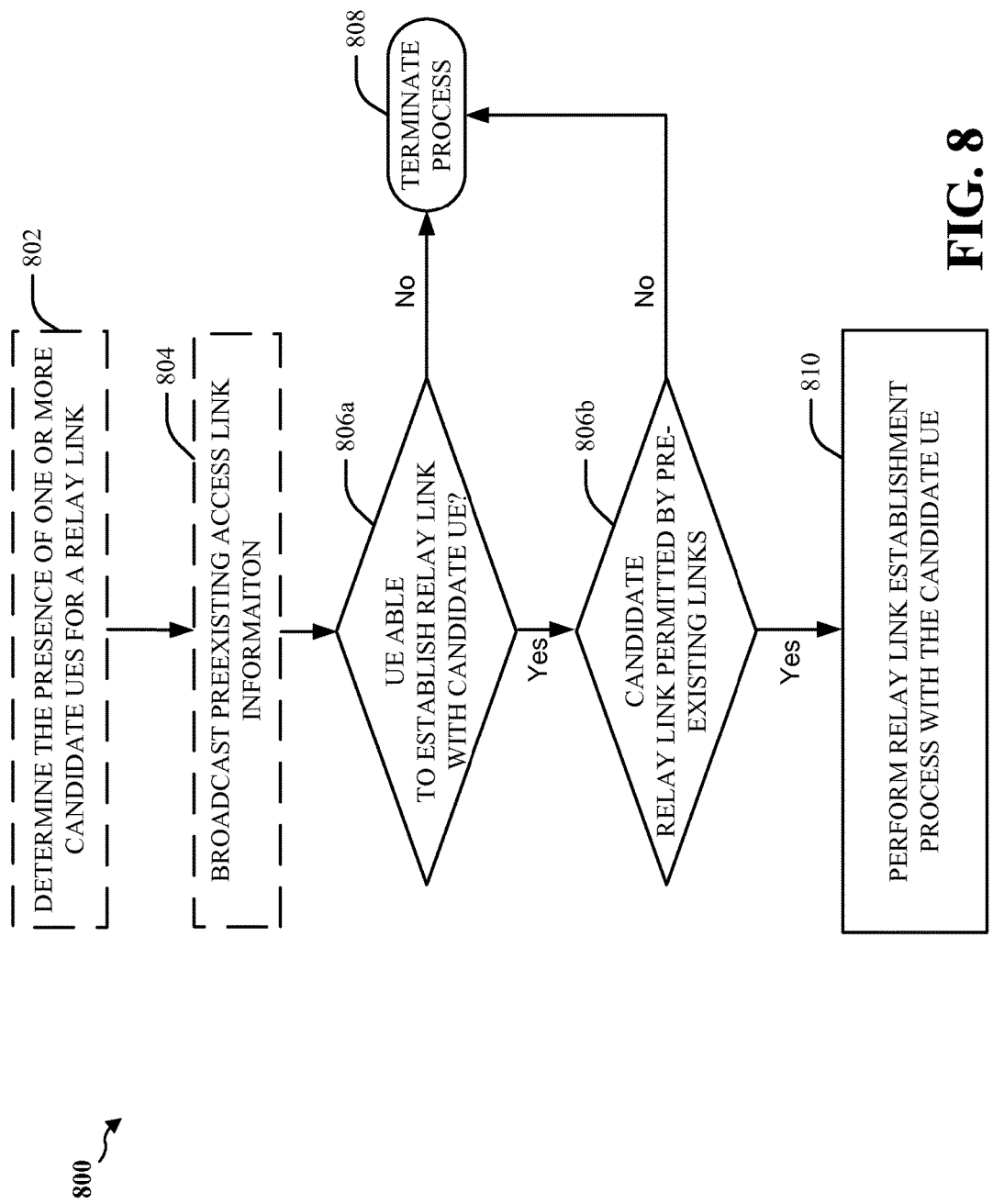
FIG. 8 is a flow chart of a method of wireless communication.

FIG. 8 is a flow chart 800 of a method of wireless communication. The method may be performed by a UE (e.g., UE 704, UE 706). Further, the functionality described in the blocks depicted in flow chart 800 may be performed by various modules (804, 906, 908, 910, 912) associated in the example apparatus 902 depicted in FIG. 9.

In an optional aspect, at block 802, a UE may determine that one or more candidate UEs are present. In an aspect, the UE may receive a list/array/matrix, etc. from an eNodeB indicating the presence of the candidate UEs. In another aspect, the UE may monitor the system for a duration of time to detect broadcasts from any candidate UEs. In an aspect, reception module 904 may receive a message 922 from eNB 702 indicating the presence of the other UEs 704, 710. In an aspect, reception module 904 may monitor for broadcasts 920, 924 from other UEs 704, 710.

In an optional aspect, at block 804, the UE may broadcast information about any preexisting access links and how many links the UE may support in total. In an aspect, each active access link may compute its current interference and maximum tolerable interference and broadcasts this information. In another aspect, the information about any preexisting access links may include a value (e.g., a yes/no bit) indicating whether the UE may support any more access links. In an aspect, the transmission module 912 may broadcast the information 928.

At block 806a, the UE may determine whether it is able to establish a candidate relay link with a candidate UE of the one or more candidate UEs. In an aspect, UE relay link capability module 906 may use received information (e.g. 922, 924) to determine the UE capability 928. In an aspect, the candidate relay link may be an uplink (UL) relay link, a downlink (DL) relay link, or UL and DL relay links. In an aspect, the UE may determine whether it is able to establish the candidate relay link based on information associated with any preexisting access links with the UE, any preexisting access links within the vicinity (e.g., within a threshold range) of the UE, any other UE UL interference, etc. For example, a first UE may attempt to establish a link with a relay candidate UE in an environment in which there is also a pre-existing link between a third UE and a fourth UE in the vicinity of and visible to the first UE or the relay candidate UE. In such an environment, the first UE and/or the relay candidate UE may take into account any pre-existing access links with the first UE and/or the relay candidate UE, and any pre-existing access links within the vicinity of the first UE and/or the relay candidate UE. In such an aspect, the impact of preexisting access links on the candidate relay link may be determined as the in-degree of the interference graph of access links. Further, for estimating the rate seen on access link, it may be assumed that the access links will use 1/(N+1) of the resource, where N is the in-degree. In another aspect, the impact of other UE UL interference on the candidate relay link may be determined as the (averaged) received interference power.

If at block 806a, the UE determines that it is unable to establish the candidate relay link with the candidate UE, then at block 808, the process may terminate. In an aspect, relay link determination module 910 may determine to not establish the candidate relay link 930.

Once the UE determines it can establish the candidate relay link with the candidate UE, then at block 806b, the impact of choosing the candidate relay link on a preexisting access link is determined by whether or not the candidate relay link will increase the in-degree of the preexisting access link beyond the maximum number (e.g., the broadcast information from block 804). In an aspect, candidate UE relay link capability module 908 may use received information (920, 922) to determine the capabilities 926 of a relay candidate UE 704. This determination can happen at the UE and/or the candidate relay UE. In an aspect, the UE may send a message to the candidate relay UE prompting the candidate relay UE to perform an evaluation to determine whether the candidate relay UE can support the relay link, and to send a message back to the UE indicating whether the candidate relay UE can support the relay link. In another aspect, the UE may receive a similar message prompting the UE to perform an evaluation to determine whether the UE can support a relay link.

If at block 806b, the UE and/or the candidate UE determines that a preexisting link's in-degree is increased beyond the maximum number, the process may terminate at block 808. As noted above, relay link determination module 910 may determine to not establish the candidate relay link 930.

Otherwise, at block 810, the UE may establish the candidate relay link with the candidate UE. In an aspect, relay link determination module 910 may determine to select the candidate relay link 930 and may establish the relay link 930 through assistance from transmission module 912.

Figure 9:
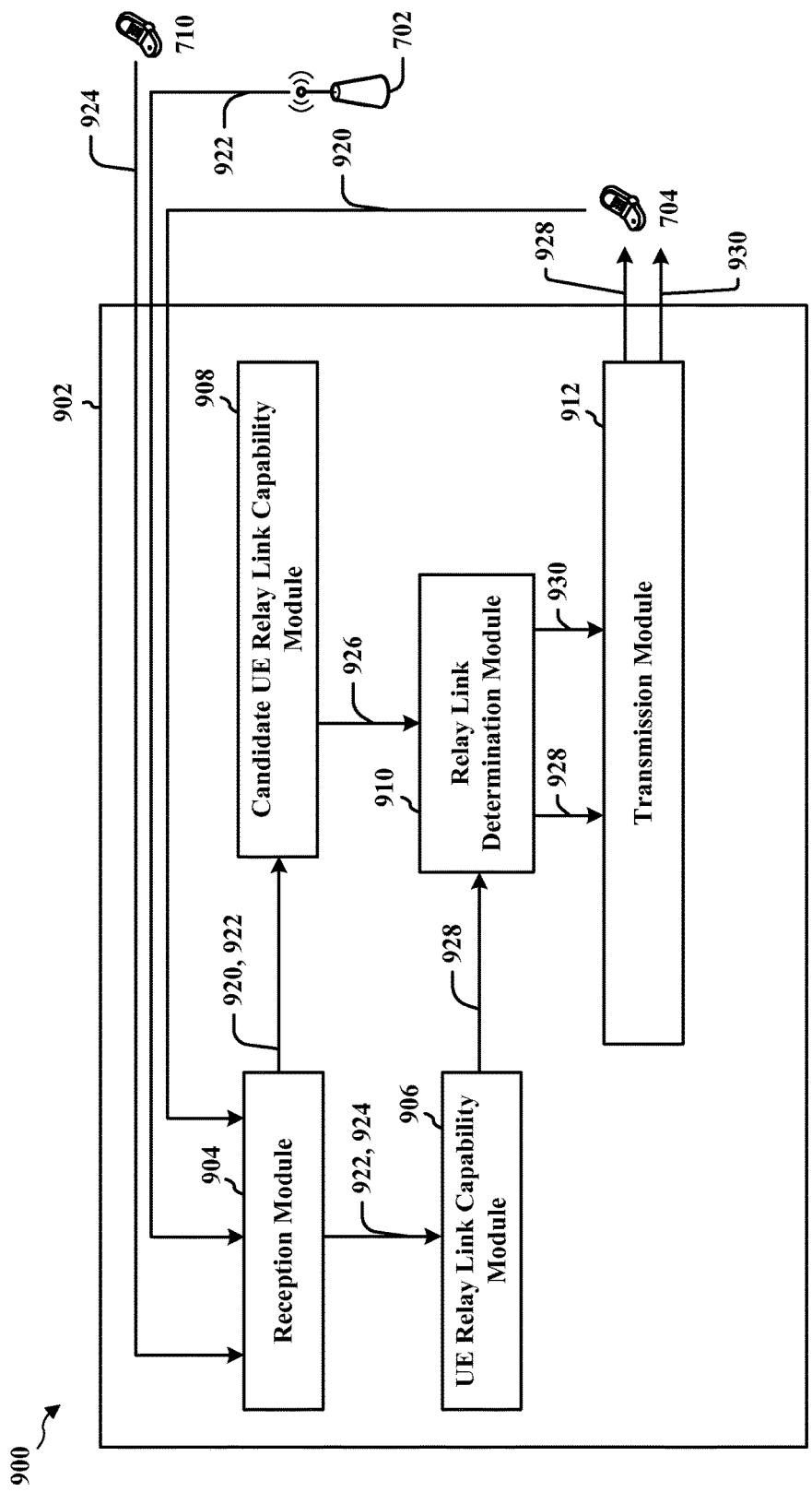
FIG. 9 is a conceptual data flow diagram illustrating the data flow between different modules/means/components in an exemplary apparatus.

FIG. 9 is a conceptual data flow diagram 900 illustrating the data flow between different modules/means/components in an example apparatus 902. The apparatus may be a UE (e.g., UE 704, UE 706). As described with reference to FIG. 8, the apparatus 902 includes a reception module 904, UE relay link capability module 906, candidate UE relay link capability module 908, relay link determination module 910, and transmission module 912.

The apparatus may include additional modules that perform each of the steps of the algorithm in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
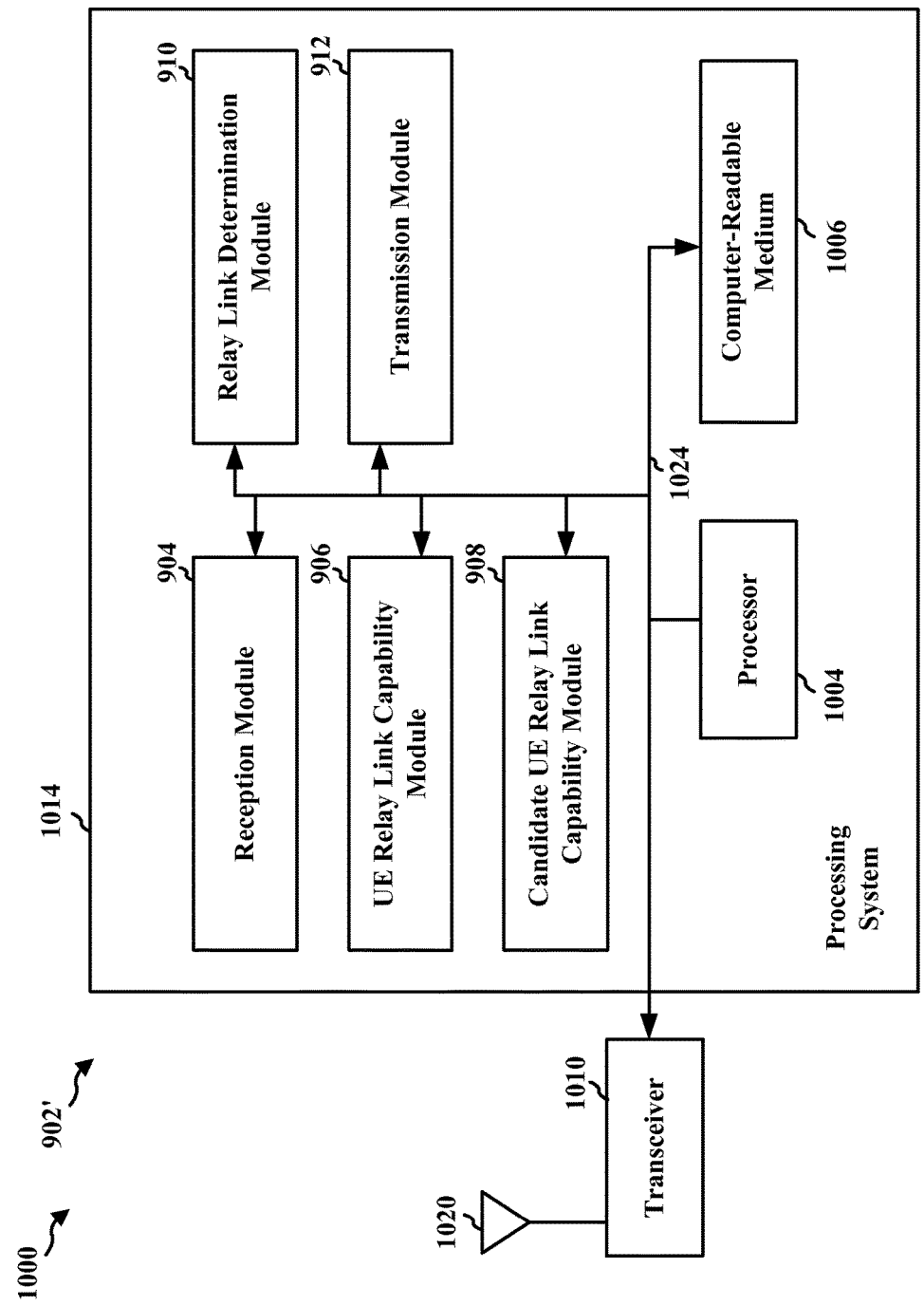
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910, and 912. The modules may be software modules running in the processor 1004, resident/stored in the computer-readable medium 1006, one or more hardware modules coupled to the processor 1004, or some combination thereof. The processing system 1014 may be a component of the UE 550 and may include the memory 560 and/or at least one of the TX processor 568, the RX processor 556, and the controller/processor 559.

In one configuration, the apparatus 902/902' for wireless communication includes means for determining that a UE is able to establish a relay link with a candidate UE based on at least one of information associated with any preexisting access links with the UE, information associated with any preexisting accessing links within a threshold vicinity of the UE or the candidate UE, or any other UE uplink UL interference, means for determining that the candidate UE is able to support the relay link based on information associated with preexisting access links for the candidate UE, and means for performing a link establishment process for the relay link with the candidate UE based on the determinations. In an aspect, the apparatus 902/902' may further include means for receiving a list of one or more candidate UEs from an eNodeB. In an aspect, the apparatus 902/902' may further include means for performing measurements to detect one or more candidate UEs. In an aspect, the apparatus 902/902' may further include means for broadcasting a total number of access links that the UE can support and a number of access links currently supported by the UE. In an aspect, the apparatus 902/902' may further include means for transmitting a message to prompt the candidate UE to perform an evaluation to determine whether the candidate UE can support the relay link. In such an aspect, the apparatus 902/902' may further include means for receiving an indication from the candidate UE that the candidate UE can support the relay link. In an aspect, the apparatus 902/902' may further include means for receiving a message from the candidate UE prompting the UE perform an evaluation to determine whether the UE can support the relay link.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 568, the RX Processor 556, and the controller/processor 559. As such, in one configuration, the aforementioned means may be the TX Processor 568, the RX Processor 556, and the controller/processor 559 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications performed by a user equipment (UE), the method comprising:
   determining that the UE is able to establish a relay link with a candidate UE based on at least one of information associated with any existing access links with the UE, information associated with any existing access links within a threshold vicinity of the UE, or any other UE uplink (UL) interference;
   determining that the candidate UE is able to support the relay link based on information indicating whether one or more existing device-to-device (D2D) links supported by a non-candidate UE within the threshold vicinity of the UE can tolerate an additional interfering D2D link; and
   performing a link establishment process for the relay link with the candidate UE based on the determinations.

2. The method of claim 1, further comprising:
   receiving a list of one or more candidate UEs from an eNodeB.

3. The method of claim 1, further comprising:
   performing measurements to detect one or more candidate UEs.

4. The method of claim 1, wherein the relay link comprise at least one of an UL relay link, a downlink (DL) relay link, or UL and DL relay links.

5. The method of claim 1, wherein the information associated with any existing access links with the UE comprises a total number of access links that the UE can support and a number of access links currently supported by the UE.

6. The method of claim 5, further comprising:
   broadcasting the total number of access links that the UE can support and the number of access links currently supported by the UE.

7. The method of claim 1, wherein the determining that the UE is able to establish the relay link with the candidate UE is further based on information indicating a potential impact of any other UE UL interference on the relay link, the other UE UL interference comprising an averaged received interference power value.

8. The method of claim 1, wherein the determining that the candidate UE is able to support the relay link is further based on information indicating a total number of access links that the candidate UE can support and existing access links supported by the candidate UE obtained from a broadcast information provided by the candidate UE.

9. The method of claim 8, wherein the broadcast information further comprises the information indicating whether one or more existing D2D links supported by the non-candidate UE within the threshold vicinity of the UE can tolerate an additional interfering D2D link.

10. The method of claim 1, further comprising:
    transmitting a message to prompt the candidate UE to perform an evaluation to determine whether the candidate UE can support the relay link.

11. The method of claim 10, wherein the performing the link establishment process comprises:
    receiving an indication from the candidate UE that the candidate UE can support the relay link.

12. The method of claim 1, further comprising:
    receiving a message from the candidate UE prompting the UE to perform an evaluation to determine whether the UE can support the relay link.

13. The method of claim 1, wherein an existing D2D link exists between a third UE and a fourth UE within the threshold vicinity of the UE, and wherein the information indicating whether one or more existing D2D links supported by the non-candidate UE within the threshold vicinity of the UE can tolerate an additional interfering D2D link comprises at least one of:
    a value indicating a number of additional D2D links that can be allowed within the threshold vicinity of the third UE and the fourth UE; or
    a value indicating whether any more D2D links can be supported within the threshold vicinity of the third UE and the fourth UE.

14. The method of claim 1, wherein the UE is an edge UE and wherein the candidate UE is a relay UE, wherein the edge UE receives service from an eNodeB through the relay UE.

15. The method of claim 1, wherein the UE is a relay UE and wherein the candidate UE is an edge UE, wherein the edge UE receives service from an eNodeB through the relay UE.

16. An apparatus for communication, the apparatus being a user equipment (UE) comprising:
    means for determining that the UE is able to establish a relay link with a candidate UE based on at least one of information associated with any existing access links with the UE, information associated with any existing access links within a threshold vicinity of the UE, or any other UE uplink (UL) interference;
    means for determining that the candidate UE is able to support the relay link based on information indicating whether one or more existing device-to-device (D2D) links supported by a non-candidate UE within the threshold vicinity of the UE can tolerate an additional interfering D2D link; and means for performing a link establishment process for the relay link with the candidate UE based on the determinations.

17. The apparatus of claim 16, further comprising:
means for receiving a list of one or more candidate UEs from an eNodeB.

18. The apparatus of claim 16, further comprising:
means for performing measurements to detect one or more candidate UEs.

19. The apparatus of claim 16, wherein the relay link comprise at least one of an UL relay link, a downlink (DL) relay link, or UL and DL relay links.

20. The apparatus of claim 16, wherein the information associated with any existing access links with the UE comprises a total number of access links that the UE can support and a number of access links currently supported by the UE.

21. The apparatus of claim 20, further comprising:
means for broadcasting the total number of access links that the UE can support and the number of access links currently supported by the UE.

22. The apparatus of claim 16, wherein the determining that the UE is able to establish the relay link with the candidate UE is further based on information indicating a potential impact of any other UE UL interference on the relay link, the other UE UL interference comprising an averaged received interference power value.

23. The apparatus of claim 16, wherein the determining that the candidate UE is able to support the relay link is further based on information indicating a total number of access links that the candidate UE can support and existing access links supported by the candidate UE obtained from a broadcast information provided by the candidate UE.

24. The apparatus of claim 23, wherein the broadcast information further comprises the information indicating whether one or more existing D2D links supported by the non-candidate UE within the threshold vicinity of the UE can tolerate an additional interfering D2D link.

25. The apparatus of claim 16, further comprising:
means for transmitting a message to prompt the candidate UE to perform an evaluation to determine whether the candidate UE can support the relay link.

26. The apparatus of claim 25, further comprising:
means for receiving an indication from the candidate UE that the candidate UE can support the relay link.

27. The apparatus of claim 16, further comprising:
means for receiving a message from the candidate UE prompting the UE to perform an evaluation to determine whether the UE can support the relay link.

28. The apparatus of claim 16, wherein an existing D2D link exists between a third UE and a fourth UE within the threshold vicinity of the UE, and wherein the information indicating whether one or more existing D2D links supported by the non-candidate UE within the threshold vicinity of the UE can tolerate an additional interfering D2D link comprises at least one of:
a value indicating a number of additional D2D links that can be allowed within the threshold vicinity of the third UE and the fourth UE; or
a value indicating whether any more D2D links can be supported within the threshold vicinity of the third UE and the fourth UE.

29. The apparatus of claim 16, wherein the UE is an edge UE and wherein the candidate UE is a relay UE, wherein the edge UE receives service from an eNodeB through the relay UE.

30. The apparatus of claim 16, wherein the UE is a relay UE and wherein the candidate UE is an edge UE, wherein the edge UE receives service from an eNodeB through the relay UE.

31. An apparatus for communication, the apparatus being a user equipment (UE) comprising:
a memory; and
at least one processor coupled to the memory and configured to:
determine that the UE is able to establish a relay link with a candidate UE based on at least one of information associated with any existing access links with the UE, information associated with any existing access links within a threshold vicinity of the UE, or any other UE uplink (UL) interference;
determine that the candidate UE is able to support the relay link based on information indicating whether one or more existing device-to-device (D2D) links supported by a non-candidate UE within the threshold vicinity of the UE can tolerate an additional interfering D2D link; and perform a link establishment process for the relay link with the candidate UE based on the determinations.

32. The apparatus of claim 31, wherein the at least one processor is further configured to:
receive a list of one or more candidate UEs from an eNodeB.

33. The apparatus of claim 31, wherein the at least one processor is further configured to:
perform measurements to detect one or more candidate UEs.

34. The apparatus of claim 31, wherein the relay link comprise at least one of an UL relay link, a downlink (DL) relay link, or UL and DL relay links.

35. The apparatus of claim 31, wherein the information associated with any existing access links with the UE comprises a total number of access links that the UE can support and a number of access links currently supported by the UE.

36. The apparatus of claim 35, wherein the at least one processor is further configured to:
broadcast the total number of access links that the UE can support and the number of access links currently supported by the UE.

37. The apparatus of claim 31, wherein the determining that the UE is able to establish the relay link with the candidate UE is further based on information indicating a potential impact of any other UE UL interference on the relay link, the other UE UL interference comprising an averaged received interference power value.

38. The apparatus of claim 31, wherein the determining that the candidate UE is able to support the relay link is further based on information indicating a total number of access links that the candidate UE can support and existing access links supported by the candidate UE obtained from a broadcast information provided by the candidate UE.

39. The apparatus of claim 38, wherein the broadcast information further comprises the information indicating whether one or more existing D2D links supported by the non-candidate UE within the threshold vicinity of the UE can tolerate an additional interfering D2D link.

40. The apparatus of claim 31, wherein the at least one processor is further configured to:

transmit a message to prompt the candidate UE to perform an evaluation to determine whether the candidate UE can support the relay link.

41. The apparatus of claim 40, wherein the at least one processor is further configured to:
receive an indication from the candidate UE that the candidate UE can support the relay link.

42. The apparatus of claim 31, wherein the at least one processor is further configured to:
receive a message from the candidate UE prompting the UE to perform an evaluation to determine whether the UE can support the relay link.

43. The apparatus of claim 31, wherein an existing D2D link exists between a third UE and a fourth UE within the threshold vicinity of the UE, and wherein the information indicating whether one or more existing D2D links supported by the non-candidate UE within the threshold vicinity of the UE can tolerate an additional interfering D2D link comprises at least one of:
a value indicating a number of additional D2D links that can be allowed within the threshold vicinity of the third UE and the fourth UE; or
a value indicating whether any more D2D links can be supported within the threshold vicinity of the third UE and the fourth UE.

44. The apparatus of claim 31, wherein the UE is an edge UE and wherein the candidate UE is a relay UE, wherein the edge UE receives service from an eNodeB through the relay UE.

45. The apparatus of claim 31, wherein the UE is a relay UE and wherein the candidate UE is an edge UE, wherein the edge UE receives service from an eNodeB through the relay UE.

46. A non-transitory computer-readable medium storing computer executable code executable by one or more processors in a user equipment (UE), comprising code for:
determining that the UE is able to establish a relay link with a UE based on at least one of information associated with any existing access links with the candidate UE, information associated with any existing access links within a threshold vicinity of the UE, or any other UE uplink (UL) interference;
determining that the candidate UE is able to support the relay link based on information indicating whether one or more existing device-to-device (D2D) links supported by a non-candidate UE within the threshold vicinity of the UE can tolerate an additional interfering D2D link; and
performing a link establishment process for the relay link with the candidate UE based on the determinations.

47. The non-transitory computer-readable medium of claim 46, further comprising code for:
receiving a list of one or more candidate UEs from an eNodeB.

48. The non-transitory computer-readable medium of claim 46, further comprising code for:
performing measurements to detect one or more candidate UEs.

49. The non-transitory computer-readable medium of claim 46, wherein the relay link comprise at least one of an UL relay link, a downlink (DL) relay link, or UL and DL relay links.

50. The non-transitory computer-readable medium of claim 46, wherein the information associated with any existing access links with the UE comprises a total number of access links that the UE can support and a number of access links currently supported by the UE.

51. The non-transitory computer-readable medium of claim 50, further comprising code for:
broadcasting the total number of access links that the UE can support and the number of access links currently supported by the UE.

52. The non-transitory computer-readable medium of claim 46, wherein the determining that the UE is able to establish the relay link with the candidate UE is further based on information indicating a potential impact of any other UE UL interference on the relay link, the other UE UL interference comprising an averaged received interference power value.

53. The non-transitory computer-readable medium of claim 46, wherein the determining that the candidate UE is able to support the relay link is further based on information indicating a total number of access links that the candidate UE can support and existing access links supported by the candidate UE obtained from a broadcast information provided by the candidate UE.

54. The non-transitory computer-readable medium of claim 53, wherein the broadcast information further comprises the information indicating whether one or more existing D2D links supported by the non-candidate UE within the threshold vicinity of the UE can tolerate an additional interfering D2D link.

55. The non-transitory computer-readable medium of claim 46, further comprising code for:
transmitting a message to prompt the candidate UE to perform an evaluation to determine whether the candidate UE can support the relay link.

56. The non-transitory computer-readable medium of claim 55, further comprising code for:
receiving an indication from the candidate UE that the candidate UE can support the relay link.

57. The non-transitory computer-readable medium of claim 46, further comprising code for:
receiving a message from the candidate UE prompting the UE to perform an evaluation to determine whether the UE can support the relay link.

58. The non-transitory computer-readable medium of claim 46, wherein an existing D2D link exists between a third UE and a fourth UE within the threshold vicinity of the UE, and wherein the information indicating whether one or more existing D2D links supported by the non-candidate UE within the threshold vicinity of the UE can tolerate an additional interfering D2D link comprises at least one of:
a value indicating a number of additional D2D links that can be allowed within the threshold vicinity of the third UE and the fourth UE; or
a value indicating whether any more D2D links can be supported within the threshold vicinity of the third UE and the fourth UE.

59. The non-transitory computer-readable medium of claim 46, wherein the UE is an edge UE and wherein the candidate UE is a relay UE, wherein the edge UE receives service from an eNodeB through the relay UE.

60. The non-transitory computer-readable medium of claim 46, wherein the UE is a relay UE and wherein the candidate UE is an edge UE, wherein the edge UE receives service from an eNodeB through the relay UE.

* * * * *